3,193,546
AZO DYESTUFFS
Harlan B. Freyermuth, Easton, Pa., David I. Randall, New Vernon, N.J., and Saul R. Buc, deceased, late of Easton, Pa., by Dolores M. Buc, administratrix, Easton, Pa., assignors to General Aniline & Film Corporation, New York, N.Y., a corporation of Delaware
No Drawing. Filed Dec. 28, 1961, Ser. No. 164,210
4 Claims. (Cl. 260—200)

This invention relates to a novel group of azo dyestuffs, and more particularly to novel azo dyestuffs and their use for dyeing polyamide fibers.

In the production of nylon fabric, the variation of tension of the warp in woven goods and variations in tension of knitting machines result in an increase in the number of crystalline regions in the nylon. Most acid wool dyes do not penetrate these crystalline regions in the nylon sufficiently during the dyeing operation to produce even or level dyeings. The resulting objectionable barré effects are also thought to be partially due to variations in the temperature of heat setting of the nylon goods.

It is an object of this invention to provide novel dyestuffs which will not be subject to the above disadvantages. Another object of this invention is the provision of novel azo dyestuffs which can be used for dyeing nylon and other polyamide fibers from an acidic aqueous medium to produce dyeings exhibiting little or no barré and other objectionable effects. Still another object of this invention is the provision of a process for producing polyamide dyeings exhibiting little or no barré effects and having improved fastness to washing, and alkaline and acid perspiration. Other objects and advantages will appear as the description proceeds.

The attainment of the above objects is made possible in accordance with this invention by the provision of azo dyestuffs having the formula:

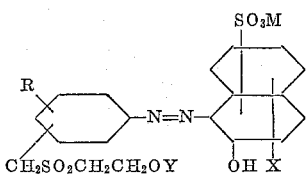

wherein Y is selected from the group consisting of H and $SO_3M$, R is selected from the group consisting of H, lower alkyl and lower alkoxy, X is selected from the group consisting of H and halogen, and M is selected from the group consisting of H, metal, ammonium, and amine cations. It has been found that these dyestuffs can be applied to polyamide fibers from an acidic aqueous medium to produce level orange dyeings exhibiting little or no barré effects and having good to excellent fastness to washing and/or to alkaline and/or acid perspiration.

In the above formula, X may represent H, Cl, Br, F, or I, R may represent H, methyl, ethyl, methoxy, ethoxy or the like, and M may represent H, metal (including alkali metal and alkaline earth metal) such as sodium, potassium, lithium, calcium, magnesium, strontium, barium, and aluminum, ammonium, or amine such as mono-, di-, and tri-methylamine, -ethylamine, -propylamine, -ethanolamine, and -propanolamine, pyridinyl, and morpholinyl, and the like. M is preferably alkali metal, particularly sodium and the $CH_2SO_2CH_2CH_2OY$ group is preferably in meta position relative to the azo bridge. When Y is $SO_3M$, the dyestuff exhibits somewhat better water-solubility than when Y is H, but this may in some cases be outweighed by other considerations. The central location of the valence bonds indicate optional substitution in any unsubstituted nuclear position.

The above defined dyestuffs may be readily prepared by coupling a suitable β-naphthol sulfonic acid in known manner with a diazotized aminobenzylsulfonylethanol of the formula:

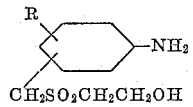

wherein R has the values given above and the methylenesulfonylethanol group is preferably in meta position relative to the amino group, followed by sulfation of the OH in said group. These diazo components may for example be prepared by chloromethylation of a suitable substituted or unsubstituted nitrobenzene (as by reaction with bis-chloromethyl ether in sulfuric acid), reaction of the resulting chloromethylated nitrobenzene with mercaptoethanol, oxidation of the resulting nitrobenzylthioethanol to the corresponding nitrobenzylsulfonylethanol (for example, by reaction with hydrogen peroxide in the presence of a tungstic acid catalyst as disclosed in U.S. 3,006,963), and reduction of the nitro group to amino (for example, by treatment with iron or the like in sulfuric acid or the like). The preferred diazo components containing the methylenesulfonylethanol group in meta position relative to the amino group, and methods for their production, are disclosed and claimed in the copending application of Buc et al., Serial No. 858,034 filed December 8, 1959, now U.S. Patent No. 3,094,516. As examples of suitable diazo components, there may be mentioned 2(2-methoxy-5-aminobenzylsulfonyl)ethanol of the formula:

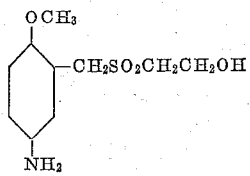

2(2-methyl-5-aminobenzylsulfonyl)ethanol, 2(2 - ethoxy-5-aminobenzylsulfonyl)ethanol, 2(4-methoxy - 5 - aminobenzylsulfonyl)ethanol, 2(4 - ethyl - 5 - aminobenzylsulfonyl)ethanol, 2(3 - aminobenzylsulfonyl)ethanol, 2(4-aminobenzylsulfonyl)ethanol, 2(2-methoxy-4-aminobenzylsulfonyl)ethanol, 2(2 - ethyl-4-aminobenzylsulfonyl) ethanol, and the like.

As examples of suitable coupling components for reaction with the above described diazo components, there may be mentioned 2-naphthol-8-sulfonic acid, 2-naphthol-5-, -6-, or -7-sulfonic acid, 5-chloro-2-naphthol-8-sulfonic acid, and other halo-substituted 2-naphtholsulfonic acids and the like.

It will be understood that in the production of the dyestuffs of this invention wherein Y is H, a subsequent sulfation of the OH group in the above described diazo components is omitted. On the other hand, dyestuffs of this invention wherein Y is $SO_3M$ may also be prepared by first sulfating the OH group of the described diazo component followed by diazotization thereof and coupling with the described naphthol coupling component. This expedient of preliminary sulfation of the diazo component has certain advantages in that the amount of sulfating agent required is reduced, the water solubility of the diazo component is thereby improved, etc. Any usual sulfating agent may be employed, sulfuric acid being preferred.

The above defined dyestuffs of this invention are useful for dyeing (including printing) polyamide fibers from an acidic aqueous medium, which latter term is intended to include solutions, dispersions, or stable or colloidal suspensions of the dyestuff adjusted to an acid pH and appropriately thickened in known manner when employed for printing. The aqueous medium may be applied by jig dyeing, padding, spraying, printing or other suitable manner. A weakly acid medium is preferred, the pH generally ranging from about 3.5 to less than 7. Any acid may be employed for adjustment of the pH, as for example formic, acetic, sulfuric, and the like. The temperature of application should range from about 140° F. up to the boiling point of the medium although higher temperatures may be employed when using a thermal dyeing process involving a subseqeunt curing step.

The dyestuffs of this invention are applicable for the dyeing of any of the synthetic linear condensation super-polyamide fibers such as nylon, Perlon, Silon, Steelon, Furon, and the like. For example, the nylon may be derived from adipic acid and hexamethylenediamine (nylon 66), omega-aminocaproic acid (nylon 6), sebacic acid and hexamethylenediamine (nylon 610), or mixtures or copolymers thereof. The polyamide fiber derived from polypyrrolidone may likewise be dyed by the present process. Natural protein fibers such as silk, goat and other animal hair, and particularly wool are readily dyed by the process of the present invention. Artificial regenerated protein fibers such as derived from casein, zein, or soya bean or the like may also be dyed by the present process. Such regenerated protein fibers are preferably of the hardened type as obtained for example by acetylation or treatment with formaldehyde.

Optimum results are obtained when the dyestuffs of this invention are applied from an acidic aqueous bath at the defined elevated temperatures to woven or knitted fabrics having a basis of nylon since by this method the described barré effects are minimized. The dyestuffs of this invention are substantive to the polyamide and accordingly the fibers should be allowed to remain in the dye bath until the dyestuff is substantially completely exhausted.

Preferably, the dyeing process is carried out without addition of acid as described above until most of the dyestuff has exhausted on to the fibrous material in order to promote levelness of the dyeing. Subsequent addition of acid aids in obtaining complete exhaustion of the dyestuff on the fiber whereafter the dyeings are simply rinsed with water and dried.

The following example is only illustrative of this invention and is not to be regarded as limitative. All parts and proportions referred to herein and in the appended claims are by weight unless otherwise indicated.

*Example*

(a) *Diazotization.*

192 ml. of a solution of 2(2-methoxy-5-aminobenzylsulfonyl)ethanol=0.1 mole and 26 ml. concentrated hydrochloric acid, sp. gr. 1,189, was cooled to 0–5° C. and diazotized by gradually adding with stirring 72 ml. 10% wt./vol. sodium nitrite solution, maintaining the temperature at 0–5° C. Stirring at 0–5° C. was continued for 10 minutes after the addition of nitrite solution was complete. The excess nitrous acid (potassium starch-iodide paper test) was destroyed by the gradual addition of 14 ml. 10% wt./vol. sulfonic acid solution. The diazo solution was made up to 400 ml. volume with water and one-fourth of this diazo solution (0.025 mole) was used in the coupling reaction.

(b) *Coupling reaction.*

12.7 g. 2-naphthol-8-sulfonic acid, 46.3% (0.025 mole plus 5% excess) was dissolved in 100 ml. water by the addition of 25 ml. 20% wt./vol. sodium carbonate solution and 1.2 ml. 50% NaOH solution. The solution (pH 9.1) was cooled to 10–15° C. and with stirring 100 ml. (0.025 mole) of the prepared diazo solution of (a) above was added. After coupling was completed, the dyestuff was precipitated by the gradual addition of 30 g. sodium chloride and stirring overnight. The precipitated dye was filtered and dried in a vacuum oven at 85° C.; Yield, 13.97 g.

(c) *Sulfate ester formation.*

13.97 g. of the azo dye of (b) above was dissolved by adding gradually to 98 g. of 96% sulfuric acid at room temperature with stirring. In order to insure complete solution the reaction mixture was stirred over night. The sulfuric acid solution was drowned into 300 g. of ice and the dyestuff was precipitated by the gradual addition of 60 g. sodium chloride. The dye mixture was filtered and the cake was slurried in 150 ml. of water. The residual acid was neutralized by the gradual addition of 7.8 g. sodium bicarbonate to pH 7.2. A few drops of glacial acetic acid was added to reduce the pH to 6.5. The dyestuff was precipitated by addition of 30 g. NaCl and stirred for several hours, filtered and dried in a vacuum oven at 85° C.;

Yield 12.09 g. The dyestuff has the formula:

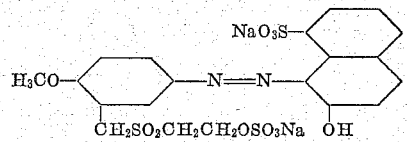

(d) *Dyeing.*—0.1 g. of the dyestuff of (c) above is added to 300 ml. water and the mixture is heated to 140° F. 10 g. nylon piece goods is added to the dye bath and manipulated while the temperature is increased to the boil and held at this temperature for one hour. 1% formic acid (based on the volume of the bath) is added and the bath is held at the boil until the dyestuff is exhausted onto the nylon. The nylon piece goods is removed and rinsed with cold water.

The nylon is dyed a bright orange shade having excellent wash fastness (wash test No. 3, AATCC) and alkaline and acid perspiration. The dyeing is level and free of barré effects.

This invention has been disclosed with respect to certain preferred embodiments and various modifications and variations thereof will become obvious to the person skilled in the art. It is to be understood that such modications and variations are to be included within the spirit and scope of this invention.

We claim:

1. An azo dyestuff of the formula:

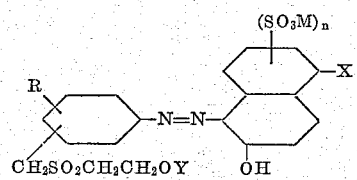

wherein Y is selected from the group consisting of H and SO$_3$M, R is selected from the group consisting of H, lower alkyl and lower alkoxy, X is selected from the group consisting of H, chlorine and SO$_3$M, M is selected from the group consisting of H and alkali metal, n is zero when X is SO$_3$M and one when X is selected from the group consisting of H and chlorine, and the

group is in one of the meta and para positions relative to the azo bridge.

2. A dyestuff as defined in claim 1 wherein the CH$_2$SO$_2$CH$_2$CH$_2$OY group is in meta position relative to the azo bridge, Y is SO$_3$M, R is lower alkoxy, X is H, and M is alkali metal.

3. A dyestuff as defined in claim 1 wherein the CH$_2$SO$_2$CH$_2$CH$_2$OY group is in meta position relative to the azo bridge, Y is H, R is lower alkoxy, X is H, and M is alkali metal.

4. An azo dyestuff of the formula:
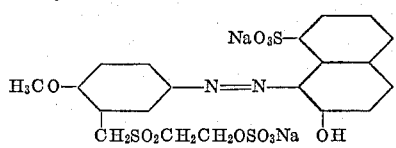
References Cited by the Examiner
UNITED STATES PATENTS
| | | | |
|---|---|---|---|
| 2,374,106 | 4/45 | Kvalnes | 8—42 |
| 2,638,403 | 5/53 | Stead et al. | 8—41 |
| 2,670,265 | 2/54 | Heyna | 260—380 XR |
| 2,735,845 | 2/56 | Ruckstuhl et al. | 260—200 |
| 2,743,267 | 4/56 | Heyna et al. | 260—200 |
| 2,806,023 | 9/57 | Wenker | 260—200 |
| 2,806,760 | 9/57 | Brassel et al. | 8—42 |
| 3,019,268 | 1/62 | Buc | 260—380 XR |
| 3,094,516 | 6/63 | Randall | 260—163 |
FOREIGN PATENTS
1,181,107   1/59   France.
OTHER REFERENCES
Luttringhaus, H., American Dyestuff Reporter, vol. 50, April 3, 1961, pp. 30–35.
CHARLES B. PARKER, *Primary Examiner.*